(12) United States Patent
Brenninger et al.

(10) Patent No.: US 8,979,216 B2
(45) Date of Patent: Mar. 17, 2015

(54) POWER BRAKING SYSTEM WITH STEERING ASSIST

(75) Inventors: Martin Brenninger, Marktoberdorf (DE); Klaus Brugger, Marktoberdorf (DE); Hans-Peter Zeiler, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 454 days.

(21) Appl. No.: 13/514,323

(22) PCT Filed: Nov. 29, 2010

(86) PCT No.: PCT/EP2010/068428
§ 371 (c)(1),
(2), (4) Date: Jan. 24, 2013

(87) PCT Pub. No.: WO2011/069858
PCT Pub. Date: Jun. 16, 2011

(65) Prior Publication Data
US 2013/0127239 A1    May 23, 2013

(30) Foreign Application Priority Data

Dec. 8, 2009  (GB) .................................. 0921433.9

(51) Int. Cl.
*B60T 13/00*  (2006.01)
(52) U.S. Cl.
USPC ........................................ 303/9.61; 188/345
(58) Field of Classification Search
CPC ....... B60T 13/64; B60T 11/21; B60T 17/221; B62D 11/08
USPC ........... 303/9.61, 189, 45; 188/345, 350, 354, 188/204 R; 180/6.2; 60/581
See application file for complete search history.

(56) References Cited

U.S. PATENT DOCUMENTS 2,911,168 A * 11/1959 Moreland ........................ 244/50
3,120,244 A * 2/1964 Hahn .......................... 137/512.5
(Continued)

FOREIGN PATENT DOCUMENTS

| EP | 1459951 A | 9/2004 |
| JP | 09071262 A | 3/1997 |

OTHER PUBLICATIONS

International Search Report for International Application No. PCT/EP2010/068428 Dated Jan. 11, 2011.
(Continued)

*Primary Examiner* — Xuan Lan Nguyen

(57) ABSTRACT

A vehicle power braking system has separate left and right brakes (11, 12) operable from a source of pressurized fluid (13) via relay valve means (16) controlled by separate left and right brake operating pedals (14, 15) to provide steering assistance during a turn. The relay valve means delivers a brake operating pressure proportional to the depression of the associated brake operating pedal to separate left and right shift valves (17, 18), each shift valve being connected with its respective operating pedal (14, 15) by a respective pilot line (19, 20) so that when each pedal is operated the associated shift valve is opened by the respective pilot line pressure to supply the proportional pressure from the relay valve means to the respective brake (11, 12). The relay valve means comprises a single relay valve (16) which supplies both shift valves (17, 18) and the pilot lines (19, 20) are interconnected via a shuttle valve (21, 22) so that the highest pilot pressure generated by operating the brake pedals (14, 15) is applied to the single relay valve (16) so that each shift valve receives the same brake applying pressure proportional to said highest pilot pressure.

11 Claims, 2 Drawing Sheets

(56) References Cited

U.S. PATENT DOCUMENTS

Figure 1:
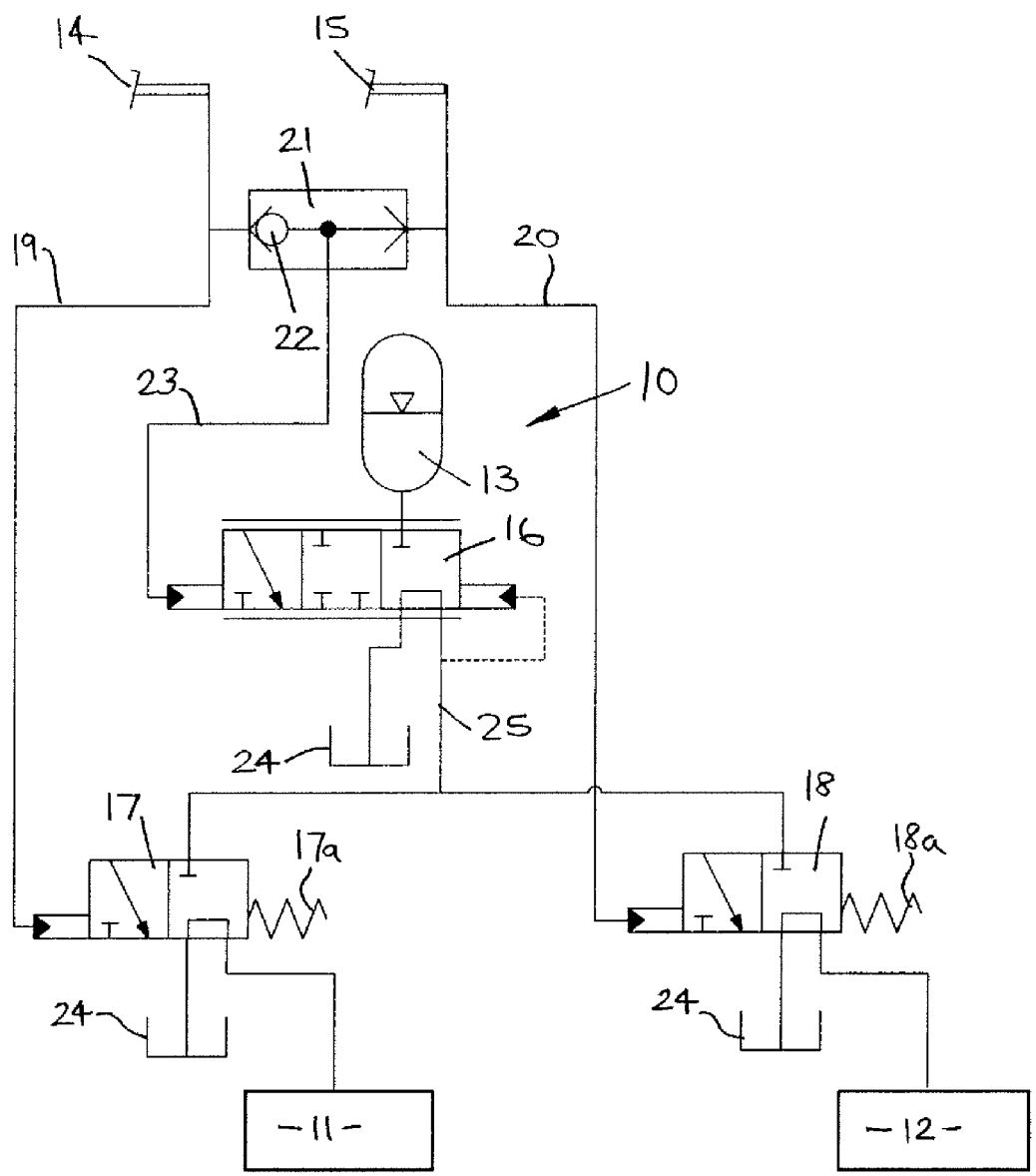

| | | | | |
|---|---|---|---|---|
| 3,640,067 A | | 2/1972 | Ingram | |
| 4,274,680 A | * | 6/1981 | Sieving et al. | 303/9.61 |
| 4,402,478 A | * | 9/1983 | Martin | 244/111 |
| 4,479,563 A | * | 10/1984 | Horsch | 180/6.7 |

OTHER PUBLICATIONS

UK Search Report for UK Application No. GB0921433.9 Dated Mar. 30, 2010.

* cited by examiner

POWER BRAKING SYSTEM WITH STEERING ASSIST

This invention relates to a power braking system for the operation of separate left and right tractor brakes which can be actuated by the operation of separate left and right brake operating pedals to provide steering assistance during a turn by applying the brake on the inside of the turn.

In known power braking systems the brake pressure is supplied from a source of pressurise fluid (e.g. a pressure accumulator) and due to the location of the brake operating pedals in the cab of the tractor which is some distance from the separate brakes and the source of pressurised fluid they use pilot operated relay valve means in the form of separate left and right relay valves to supply a pressure from the source at a pressure level determined by the depression of the left and right brake operating pedals and to supply this proportionate pressure to each brake through a respective pilot operated shift valve.

Such arrangement are relatively complex and expensive and can lead to different pressures being applied to each brake when both pedals are operated and no steering assistance is required. This can result in yawing movement of the tractor which decreases tractor stability.

It is an object of the present invention to provide an improved form of power braking system with braking assistance suitable for use in a tractor and which at least mitigates the above problems.

Thus according to the present invention there is provided a vehicle power braking system having separate left and right brakes operable from a source of pressurised fluid via relay valve means controlled by separate left and right brake operating pedals to provide steering assistance during a turn, the relay valve means delivering a brake operating pressure proportional to the depression of the associated brake operating pedal to separate left and right shift valves, each shift valve being connected with its respective operating pedal by a respective pilot line so that when each pedal is operated the associated shift valve is opened by the respective pilot line pressure to supply the proportional pressure from the relay valve means to the respective brake, the system being characterised in that the relay valve means comprises a single relay valve which supplies both shift valves and in that the pilot lines are interconnected via a shuttle valve so that the highest pilot pressure generated by operating the brake pedals is applied to the single relay valve so that each shift valve receives the same brake applying pressure proportional to said highest pilot pressure.

Such a power braking system only needs the use of one relay valve, thus making the system significantly less complex and cheaper and due to the use of the shuttle valve also avoids the application of different braking pressure to the brakes when both pedals are operated and no steering assistance is required.

The operation of each respective brake pedal may physically generate a pilot pressure (e.g using a master cylinder) which is fed to the shuttle valve and the respective shift valve. Alternatively operation of each respective brake pedal may open a respective initial control valve which provides a proportionate pilot pressure to the shuttle valve and the respective shift valve, each control valve supplying the proportionate pilot pressure from a pressurised pressure source (e.g. the same or a further pressure accumulator).

The single relay valve may be a proportionate flow control valve operated by the pilot pressure determined by the operation of the pedals.

The shift valves may be two position slide valves biased to a closed position and opened by the pilot pressure from the pedals.

Each initial control valve may also be a proportionate flow control valve operated by movement of the associated brake pedal.

Figure 2:
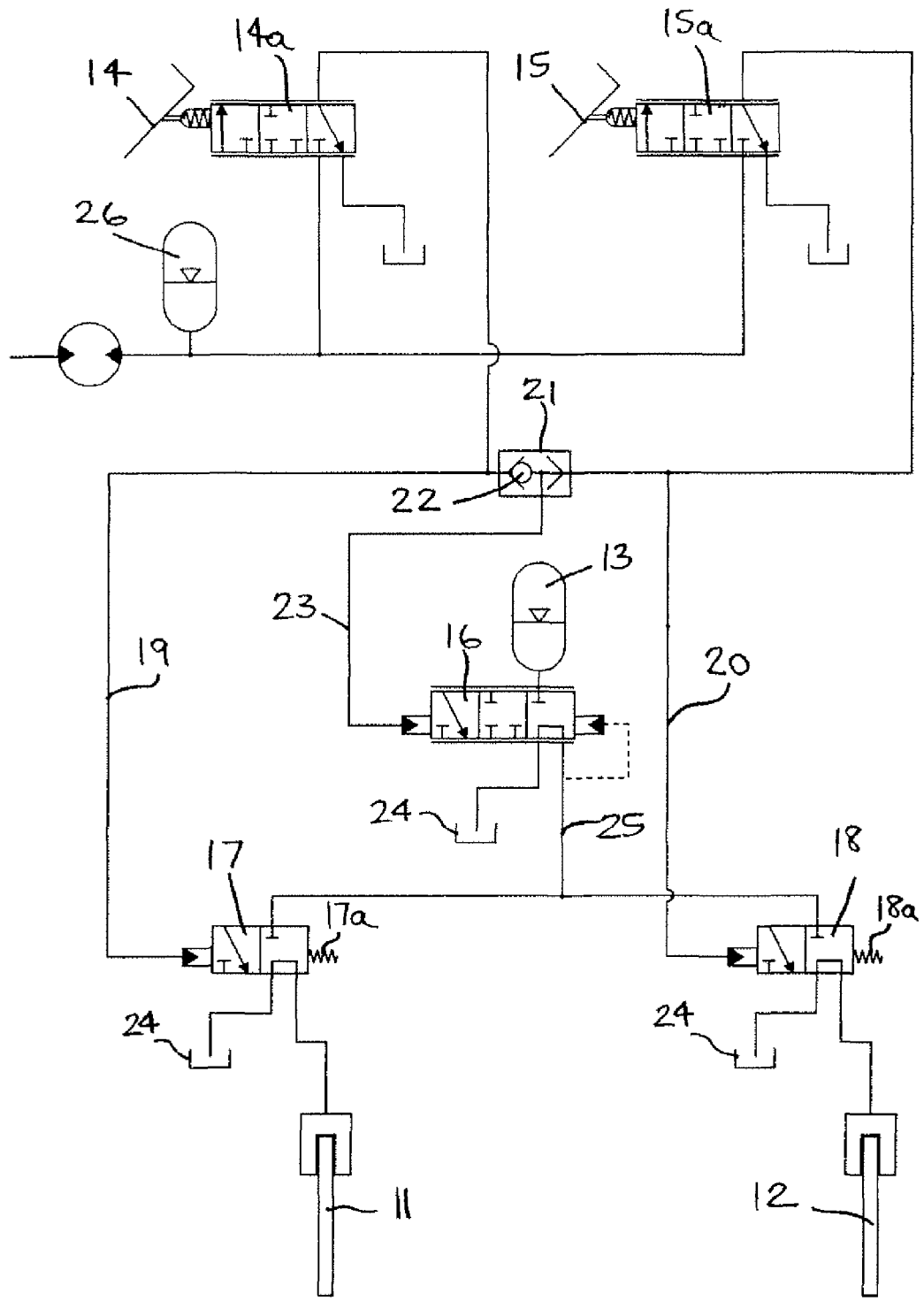

The present invention will now be described, by way of example only, with reference to the accompanying drawings in which:

FIG. 1 shows a schematic diagram of a vehicle power braking system in accordance with the present invention in which the initial actuating pressure is generated manually by depression of associated brake pedals, and FIG. 2 shows a schematic view of a vehicle power braking system in accordance with the present invention in which the initial actuating pressure is generated by opening a valve to allow the passage of pressurised fluid from an associated reservoir.

Referring to the drawings, a vehicle power braking system 10 in accordance with the present invention has separate left and right brakes 11 and 12 which are operable from a source of pressurised fluid in an accumulator 13 which is charged by a fluid pressure generating pump (not shown).

The brakes 11 and 12 are controlled by separate left and right brake operating pedals 14 and 15 respectively. A relay valve means in the form of a three position proportionate flow valve 16 is provided which receives the fluid from accumulator 13 and then distributes this pressurised fluid to brakes 11 and 12 via left and right two position shift valves 17 and 18 respectively.

Each shift valve 17 and 18 is connected with its respective brake operating pedal 14 and 15 via respective pilot lines 19 and 20. These pilot lines 19 and 20 are interconnected by a shuttle valve 21 which includes a valve member 22 which allows communication of the higher of the two pressures generated by the operation of pedal 14 and 15 to actuate relay valve 16 via line 23.

Shift valves 17 and 18 are biased to a venting condition by spring bias 17a and 18a respectively. When in the venting condition pressure from brakes 11 and 12 is vented to the system sump 24. Relay valve 16 also vents the system pressure to the sump 24 when not actuated by a pilot flow from line 23.

Thus when the power braking system is being operated with the pedals 14 and 15 disconnected for separate operation so that the brakes can be operated to provide steering assistance during a turn, when pedal 15 is depressed to apply the right brake 12 the pressure generated by pedal 15 (which comes from an associated master cylinder not shown) displaces the valve member 22 of shuttle valve 21 to the position shown in FIG. 1 so that the pilot pressure generated by operating pedal 15 is fed to relay valve 16 via line 23 and also to shift valve 18 via line 20. This generates a pressure from accumulator 13 proportional to the pressure in line 23 and this pressure is fed to shift valve 17 and 18 via line 25. As only shift valve 18 is receiving pilot pressure via line 20 the associated shift valve moves to the right, as viewed in FIG. 1, against the action of bias 18a and thus directs the pressure inline 25 to the right-hand brake 12 so that only the right-hand brake is applied to assist a turn to the right.

Similarly, if the left-hand brake pedal 14 is the only pedal to be depressed, pressure from accumulator 13 proportional to the depression of pedal 14 will be applied to the left brake 11 via the shift valve 17 which will be opened by the pressure in line 19.

If the two brake applying pedals 14 and 15 are locked together for normal braking without steering assist these two pedals may generate slightly different pressures from their associated master cylinders and the highest generated pressure (say from the pedal 15) will cause the valve member 22 to again adopt the position shown in FIG. 1. In this condition the pressure supplied to line 25 from accumulator 13 will be proportional to the higher pressure generated by pedal 15 as described above.

Thus both brakes will receive the same operating pressure from accumulator 13 and any possibility of brake imbalance is thus avoided.

In the power braking circuit described above in relation to FIG. 1 the pilot pressures generated by pedals 14 and 15 are generated manually by associated master cylinders. As will be appreciated, it is also possible for the operation of pedal 14 and 15 to open associated valves 14a and 15a to supply the pilot pressure from a second accumulator 26 (or even the previous accumulator 13). This pilot pressure from accumulator 26 is then communicated to pilot lines 19 and 20 and to the shuttle valve 21 in the same manner as previously described with reference to FIG. 1. This alternative arrangement is shown diagrammatically in FIG. 2 in which components of a similar function to those previously described in relation to FIG. 1 have been similarly numbered.

For ease of manufacture, valves 21, 17 and 18 could be provided in a single valve block.

As will be appreciated the present invention thus provides a vehicle power braking system which is simpler than the prior art systems due to the use of a single relay valve 16 and which also, by the use of the shuttle valve 21, ensures that when both brake pedals are operated the relay valve operates in response to the highest pilot pressure generated by the two pedals thus ensuring that both brakes receive the same brake applying pressure. The present invention thus avoids the previously described disadvantages of the prior art vehicle power braking systems.

The invention claimed is:

1. A vehicle power braking system having separate left and right brakes operable from a source of pressurised fluid via relay valve means controlled by separate left and right brake operating pedals to provide steering assistance during a turn, the relay valve means delivering a brake operating pressure proportional to the depression of the associated brake operating pedal to separate left and right shift valves, each shift valve being connected with its respective operating pedal by a respective pilot line so that when each pedal is operated the associated shift valve is opened by the respective pilot line pressure to supply the proportional pressure from the relay valve means to the respective brake, wherein the relay valve means comprises a single relay valve which supplies both shift valves and wherein the pilot lines are interconnected via a shuttle valve so that the highest pilot pressure generated by operating the brake pedals is applied to the single relay valve so that each shift valve receives the same brake applying pressure proportional to said highest pilot pressure.

2. A braking system according to claim 1 in which operation of each pedal physically generates a pilot pressure which is fed to the shuttle valve and the respective shift valve.

3. A braking system according to claim 1 in which operation of each respective pedal opens a respective initial control valve which provides a proportionate pilot pressure to the shuttle valve and the respective shift valve, each control valve supplying the proportionate pilot pressure from a pressurised pressure source.

4. A system according to claim 3 in which each initial control valve is a proportionate flow control valve operated by movement of the associated brake pedal.

5. A vehicle power braking system having separate left and right brakes operable from a source of pressurised fluid via relay valve means controlled by separate left and right brake operating pedals to provide steering assistance during a turn, the relay valve means delivering a brake operating pressure proportional to the depression of the associated brake operating pedal to separate left and right shift valves, each shift valve being connected with its respective operating pedal by a respective pilot line so that when each pedal is operated the associated shift valve is opened by the respective pilot line pressure to supply the proportional pressure from the relay valve means to the respective brake, wherein the relay valve means comprises a single relay valve which supplies both shift valves and wherein the pilot lines are interconnected via a shuttle valve so that the highest pilot pressure generated by operating the brake pedals is applied to the single relay valve so that each shift valve receives the same brake applying pressure proportional to said highest pilot pressure, wherein the relay valve is a proportionate flow control valve operated by the pilot pressure determined by the operation of the pedals.

6. The vehicle power braking system of claim 5, wherein operation of each pedal physically generates a pilot pressure which is fed to the shuttle valve and the respective shift valve.

7. The vehicle power braking system of claim 5, wherein operation of each respective pedal opens a respective initial control valve which provides a proportionate pilot pressure to the shuttle valve and the respective shift valve, each control valve supplying the proportionate pilot pressure from a pressurised pressure source.

8. A vehicle power braking system having separate left and right brakes operable from a source of pressurised fluid via relay valve means controlled by separate left and right brake operating pedals to provide steering assistance during a turn, the relay valve means delivering a brake operating pressure proportional to the depression of the associated brake operating pedal to separate left and right shift valves, each shift valve being connected with its respective operating pedal by a respective pilot line so that when each pedal is operated the associated shift valve is opened by the respective pilot line pressure to supply the proportional pressure from the relay valve means to the respective brake, wherein the relay valve means comprises a single relay valve which supplies both shift valves and wherein the pilot lines are interconnected via a shuttle valve so that the highest pilot pressure generated by operating the brake pedals is applied to the single relay valve so that each shift valve receives the same brake applying pressure proportional to said highest pilot pressure, wherein the shift valves are two position slide valves biased to a closed position and opened by the pilot pressure from the pedals.

9. The vehicle power braking system of claim 8, wherein operation of each pedal physically generates a pilot pressure which is fed to the shuttle valve and the respective shift valve.

10. The vehicle power braking system of claim 8, wherein operation of each respective pedal opens a respective initial control valve which provides a proportionate pilot pressure to the shuttle valve and the respective shift valve, each control valve supplying the proportionate pilot pressure from a pressurised pressure source.

11. The vehicle power braking system of claim 8, wherein the relay valve is a proportionate flow control valve operated by the pilot pressure determined by the operation of the pedals.

* * * * *